United States Patent [19]

Lee

[11] Patent Number: 4,907,919
[45] Date of Patent: Mar. 13, 1990

[54] KEY MANUFACTURING MACHINE

[76] Inventor: Miko Lee, No. 5, Li Hsing Lane, Chung-Cheng Rd., Hsingchuang City, Taipei Hsien, Taiwan

[21] Appl. No.: 281,441

[22] Filed: Dec. 8, 1988

[51] Int. Cl.[4] .............................................. B23C 1/16
[52] U.S. Cl. ...................................... 409/81; 76/110; 408/241 S; 408/71
[58] Field of Search ..................... 409/81, 82, 83, 229; 76/110; 408/71, 14, 241 S

[56] References Cited

U.S. PATENT DOCUMENTS

| | | | |
|---|---|---|---|
| 1,978,009 | 10/1934 | Caron | 409/82 |
| 3,418,882 | 12/1968 | Brand | 409/82 |
| 4,203,693 | 5/1980 | Schwartz | 76/110 |
| 4,411,567 | 10/1983 | Agius | 76/110 |

Primary Examiner—Roscoe V. Parker
Attorney, Agent, or Firm—Zarley, McKee, Thomte, Voorhees & Sease

[57] ABSTRACT

A key manufacturing machine utilizing a drilling assembly adapted to perform a drilling operations including a rotating assembly having a number of attaching block assemblies circumferentially spaced at its top portion. Each of the attaching block assemblies has a setting wheel which includes an integral wheel part and a shaft part, and which is turnable to set a desired position. A number of set screws are each disposed within a corresponding threaded hole on the wheel part of the attaching block assembly to be adjustable to respective depths. A sensing device is utilized to sense the depth of each set screw for controlling the drilling depth during the drilling operation.

2 Claims, 7 Drawing Sheets

KEY MANUFACTURING MACHINE

BACKGROUND OF THE INVENTION

This invention relates to a key manufacturing machine. The key manufacturing machine utilizes a conventional drilling means which is adapted to facilitate drilling operation thereof. Conventionally, the key manufacturing machine has a rotating means therein for receiving other components so that a key can be suitably supported and positioned for machining or drilling. The rotating means utilized at the present time has a top end portion thereof which is provided circumferentially with a plurality of studs protruding upward in different height. When a desired height of the stud or configuration of all studs is required, a changeover of respective stud is performed. In order to machine a key more efficiently or to obtain a semi-automatic machining operation of a key, the present invention has improved the rotating means to be adjustable and pre-settable and further incorporates a sensing device therein.

SUMMARY OF THE INVENTION

This invention relates to a key manufacturing machine utilizing a drilling means adapted to facilitate drilling operations and, more particularly, to improvements about rotating means thereof. A sensing device is incorporated for facilitating semi-automatic machining operations of this key manufacturing machine.

Therefore, a primary objective of the present invention is to provide a key manufacturing machine incorporating a rotating means which has adjustable and pre-settableset screws.

Another objective of the present invention is to provide a key manufacturing machine incorporating a sensing device to cooperate with the rotating means for facilitating semi-automatic machining operations.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
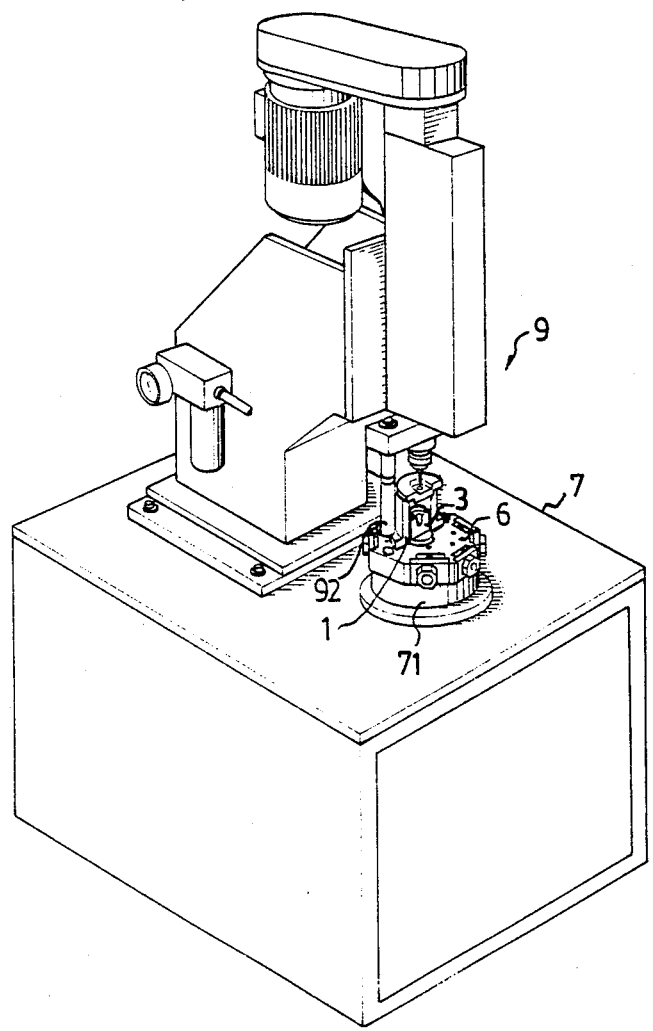
FIG. 1 is a perspective view of a key manufacturing machine in accordance with the present invention.
Figure 2:
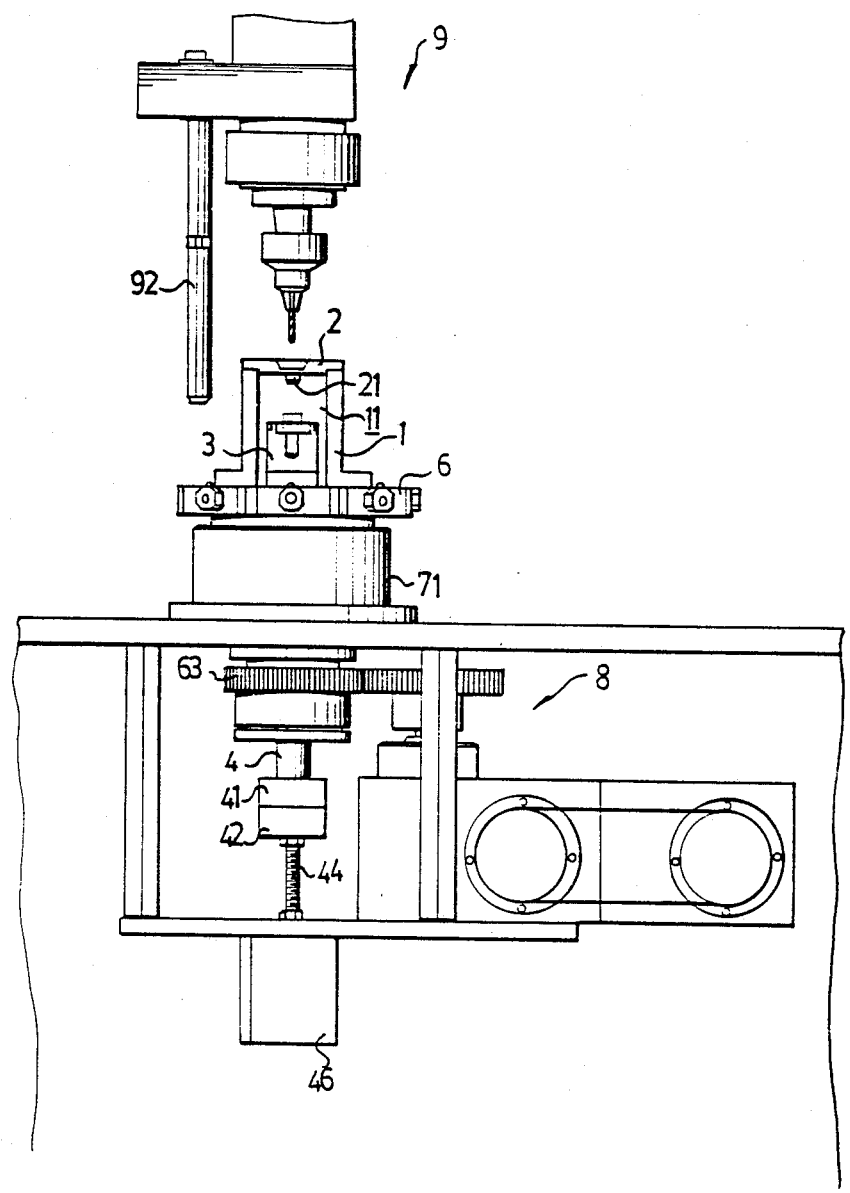
FIG. 2 is a front view of the key manufacturing machine of FIG. 1, with the drilling means and mounting frame being partially cut away to show the elements inside.

As shown in FIGS. 1 and 2, a key manufacturing machine utilizing a drilling means 9 in accordance with the present invention comprises a rotating means 6 having a plurality of attaching block assemblies 61 circumferentially spaced at a top portion thereof, a base block 1, a mounting means 4, a positioning block 3, and a transmission means 8.

Figure 3:
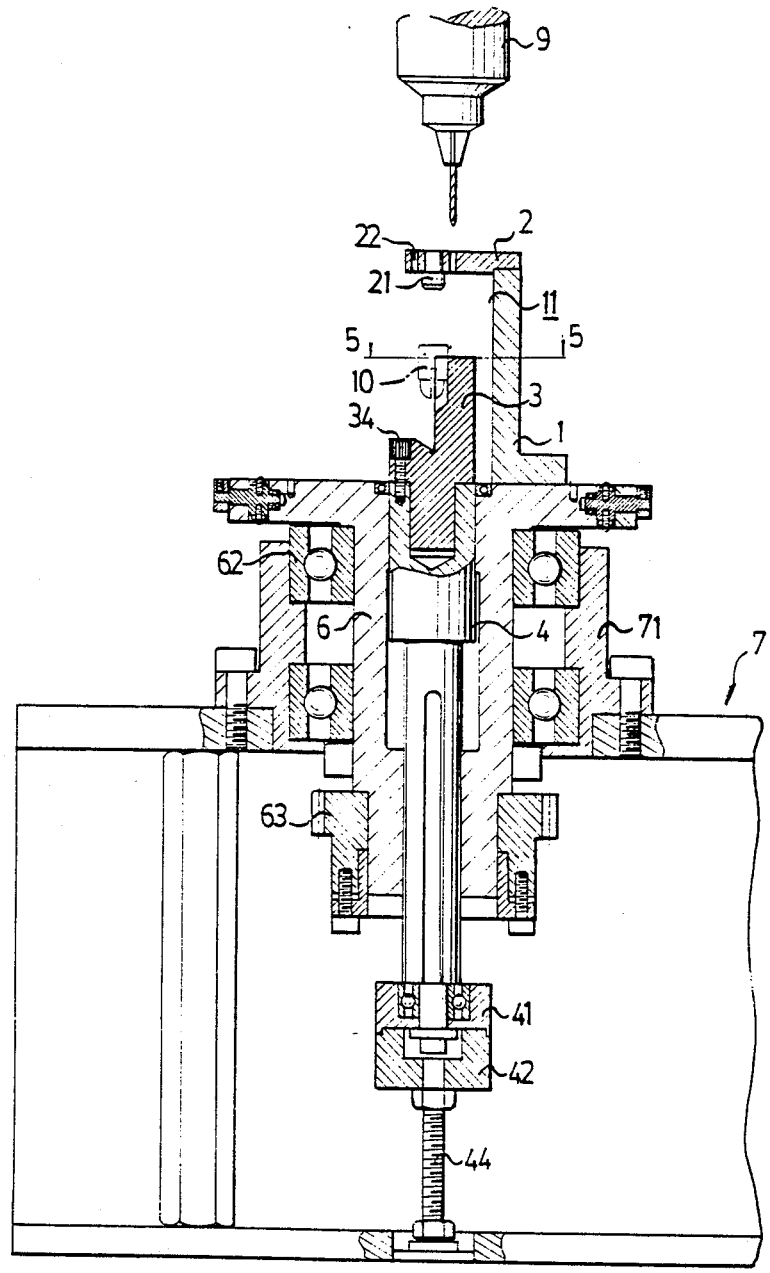
FIG. 3 is a side cross-sectional view of the key manufacturing machine of FIG. 1, showing the positioning block in a normal position.
Figure 4:
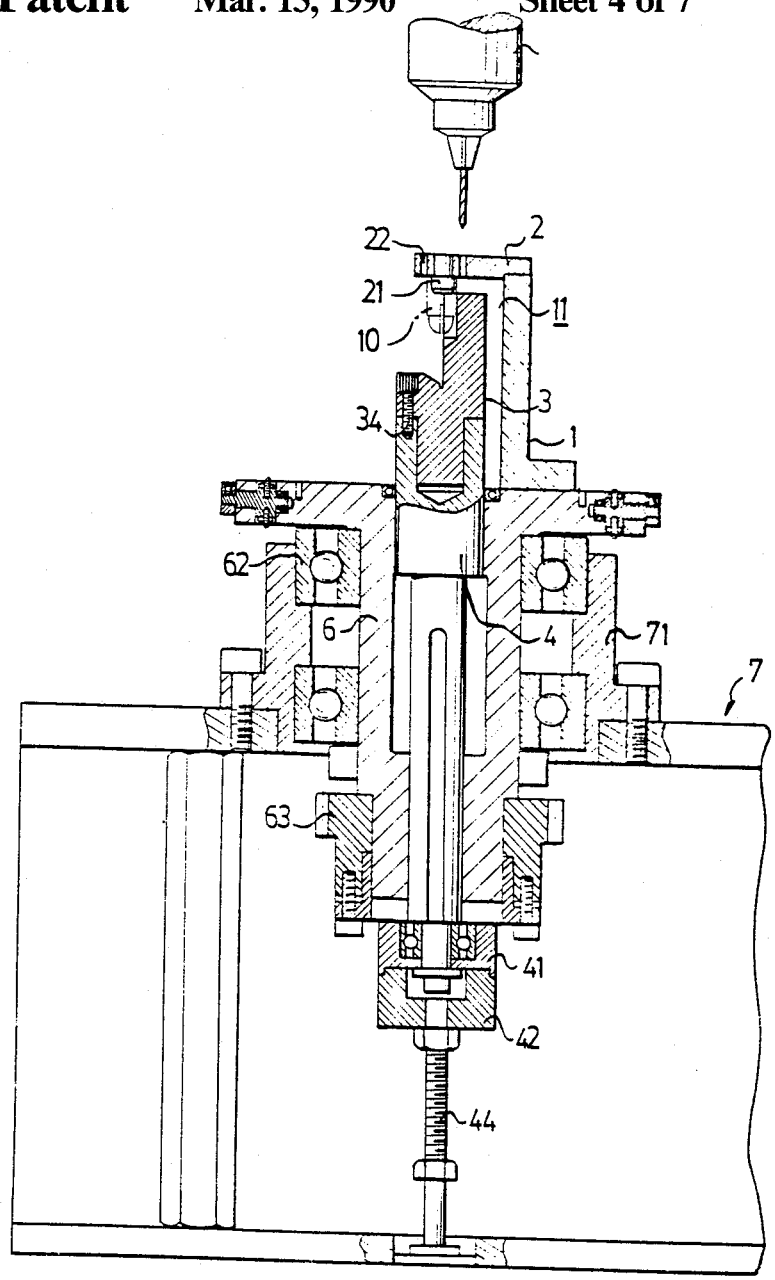
FIG. 4 is a same view as in FIG. 3, but with the positioning block being shown in an elevated position.

Referring to FIGS. 2 and 3, the cylindrically shaped rotating means 6 has a center-bore portion which receives the mounting means 4 therewithin. A transmission gear 63 connected at a lower portion of the rotating means 6 is engaged with the transmission means 8. The rotating means 4 is rotatable relative to a stationary bottom block 71 which is further bolted to a frame 7. A pair of bearings 62 are disposed between the rotating means 6 and the stationary bottom block 71 to provide firm support. The block assembly 61 is sensed by a sensing device 92 for controlling a drilling depth of a key 10 during the drilling operation. The structures of the block assembly 61 will be further described later.

The base block 1 is fixedly disposed on the top portion of the rotating means 6 and is semi-cylindrically shaped to form a cavity 11. The guiding plate 2 is attached to a top end of the base block 1 and has a pin 21 protruding downward and a plurality of longitudinal through-holes 22 circumferentially disposed thereon relative to the pin 21. The pin 21 is used for positioning the key 10 to be machined and the through-holes 22 are provided to allow the drill of the drilling means 9 to pass therethrough.

The mounting means 4 is received within the center-bore portion of the rotating means 6 to allow longitudinal movement relative to the rotating means 6 and to prevent relative rotation therebetween by providing a keyway or the like thereon. A pair of adjusting blocks 41,42 are connected between a bottom end of the mounting means 4 and a guide screw 44 driven by a gas cylinder 46 to set the height of a positioning block 3. The positioning block 3 is rotatably secured on a top end of the mounting means 4 by an adjustable stud 34. An arc slot 33 is disposed on the positioning block 3 to facilitate the rotation of the positioning block 3 relative to the mounting means 4.

Figure 5:
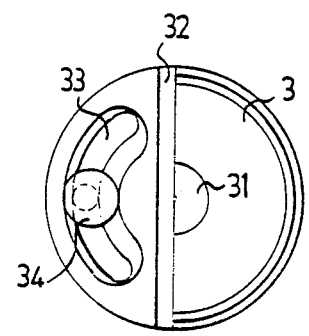
FIG. 5 is a top plan view of the positioning block for supporting and positioning the key.

The positioning block has a center-bored portion to form a bearing surface 31 for supporting the key 10 and a traverse groove 32 for positioning the key 10, as clearly shown in FIG. 5. The transmission means 8 is provided to engage with the transmission gear 63 on the rotating means 6 for facilitating a semi-automatic machining operation.

Figure 6:
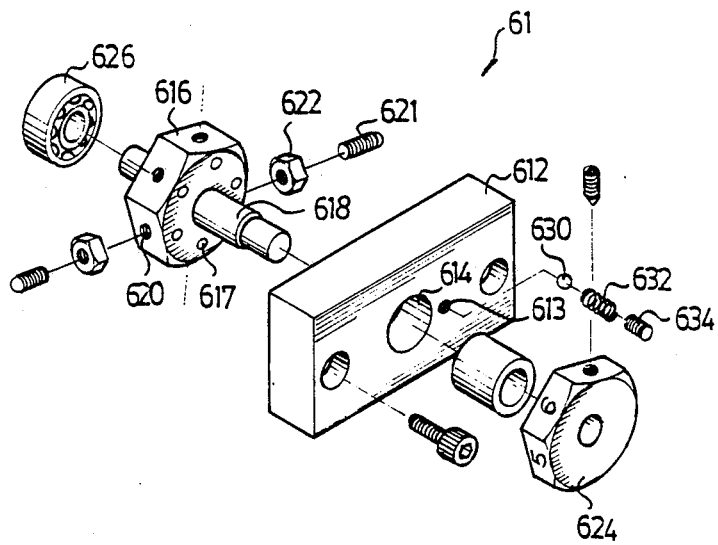
FIG. 6 is an exploded view of an attaching block assembly in accordance with the present invention.
Figure 7:
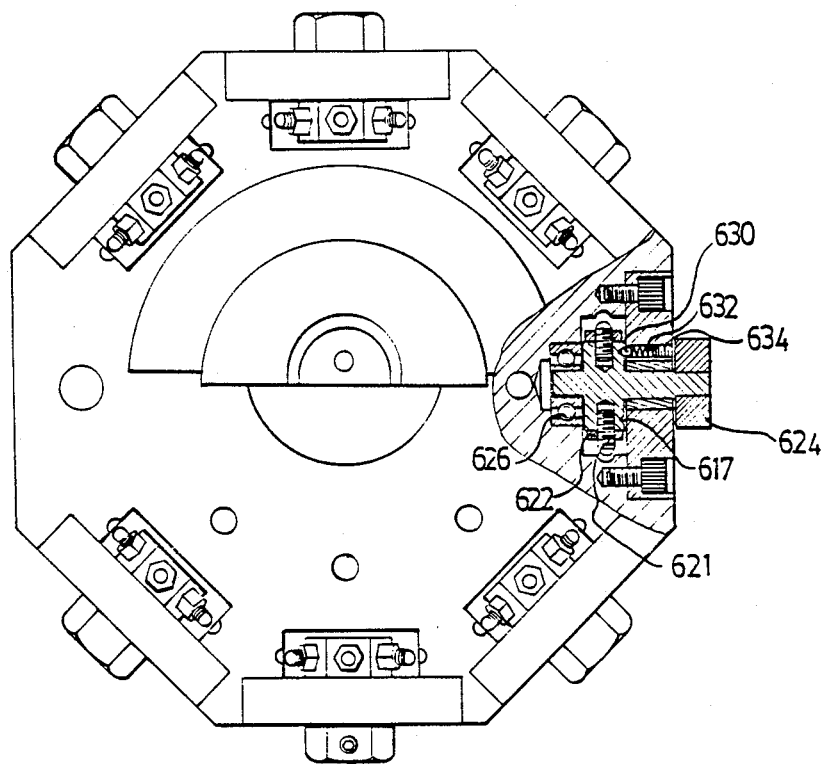
FIG. 7 is a top plan view of the rotating means with a portion being partially broken away for clearly showing the attaching block assembly.

Referring now to FIGS. 6 and 7, the plurality of attaching block assemblies 61 are respectively disposed within a corresponding number of recesses circumferentially spaced at the top portion of the rotating means 6. The attaching block assemblies 61 each has a securing block 612 and a setting wheel. The securing block 612, having a central hole 614, is fixedly secured to the rotating means 6. The setting wheel comprises an integral wheel part 616 and a shaft part 618. The wheel part 616 is a regular polygon with each side face thereof having a threaded hole 620 for receiving a set screw 621 and a nut 622. The set screw 621 is sensed by the sensing device 92 for controlling the drilling depth of the key 10 during the drilling operation. The shaft part 618 is connected to a control wheel 624 at one end thereof and is received within a bearing 626 at another end thereof. A corresponding number of recesses 617 are provided on an outward face of the wheel part 616 with each recess 617 adjacent to the side face.

A combination of a steel ball 630, a spring 632 and a set screw 634 are received within a threaded hole 613, which is adjacent to the central hole 614 of the securing block 612. The steel ball 630 will engage with the recesses 617 thereby controlling the rotational movement of the wheel part 616. Each set screw 621 is received within the respective threaded hole 620 of the wheel part 616. When all set screws 621 are screwed to a particular depth on the wheel part 616 of respective attaching block assembly 61, all attaching block assemblies 61 can be pre-set to a desired position by turning the control wheel 624, so the sensing device 92 can then be utilized to sense the particular depth which is required to be changed during machining operation. Therefore, the set screws 621 are respectively adjustable on the wheel part 616 to pre-set respective drilling depths thereof.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. A key manufacturing machine utilizing a drilling means (9) adapted to facilitate drilling operations, said key manufacturing machine comprising:
   a rotating means (6) having a plurality of attaching block assemblies (61) circumferentially spaced at a top portion thereof and a transmission gear (63) at a lower portion thereof, said rotating means (6) having a center-bore portion and being rotatable relative to a stationary bottom block (71) on a pair of bearings (62) disposed therebetween, said block assembly (61) being sensed by a sensing device (92) for controlling a drilling depth during said drilling operation;
   a base block (1) being fixedly disposed on said top portion of said rotating means (6) and being semi-cylindrically shaped to form a cavity (11) therealong;
   a guiding plate (2) being attached to a top end of said base block (1) and having a pin (21) protruding downward and a plurality of longitudinal through-holes (22) disposed circumferentially thereon relative to said pin (21);
   a mounting means (4) being received within said center-bore portion of said rotating means (6) to allow longitudinal movement relative to said rotating means (6) and to prevent relative rotation therebetween;
   a positioning block (3) being rotatably secured on a top end of said mounting means (4) by an adjustable stud (34), an arc slot (33) being disposed on said positioning block (3) to facilitate a rotation of said positioning block (3) relative to said mounting means (4), said positioning block having a center-bored portion to form a bearing surface (31) for supporting a key and having a traverse groove (32) for positioning the key;
   a pair of adjusting blocks (41, 42) being connected between a bottom end of said mounting means (4) and a guide screw (44) driven by of a gas cylinder (46) to set a height of said positioning block (3); and
   a transmission means (8) being provided to engage with said transmission gear (63) on said rotating means (6) for facilitating a semi-automatic machining operation.

2. A key manufacturing machine as claimed in claim 1, wherein said plurality of attaching block assemblies (61) are respectively disposed within a corresponding number of recesses circumferentially spaced at said top portion of said rotating means (6), said block assemblies (61) each comprising:
   a securing block (612) being fixedly secured to said rotating means (6) and having a central hole (614);
   a setting wheel comprising an integral wheel part (616) and a shaft part (618), said wheel part (616) being a regular polygon with each side face thereof having a threaded hole (620) for receiving a set screw (621) and a nut (622), said set screw (621) being sensible by said sensing device (92); said shaft part (618) being connected to a control wheel (624) at one end thereof and being received within a bearing (626) at another end thereof; a corresponding number of recesses (617) being provided on an outward face of said wheel part (616) with each recess (617) adjacent to said side face;
   a combination of a steel ball (630), spring (632) and set screw (634) being received within a threaded hole (613) to engage with said recesses (617); said threaded hole (613) being adjacent to said central hole (614) of said securing block (612); and
   said set screws (621) being received within said threaded hole (620) of said wheel part (616); said set screws (621) being respectively adjustable on said wheel part (616) so as to pre-set respective drilling depths thereof.

* * * * *